April 17, 1934. G. L. COLBIE 1,955,410
METHOD AND APPARATUS FOR MAKING TUBULAR ARTICLES FROM STRIP MATERIAL
Filed April 23, 1932 5 Sheets-Sheet 1
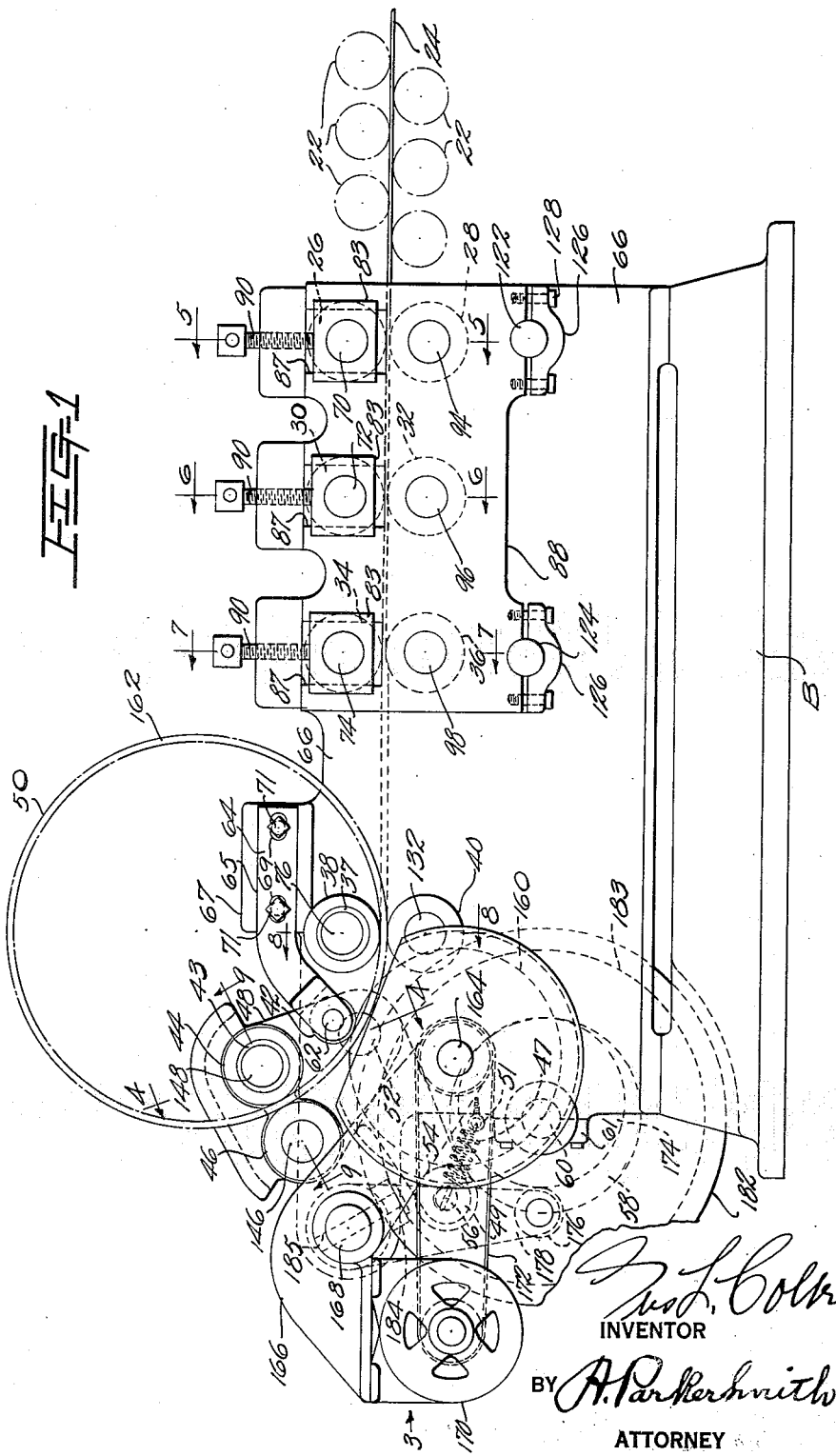

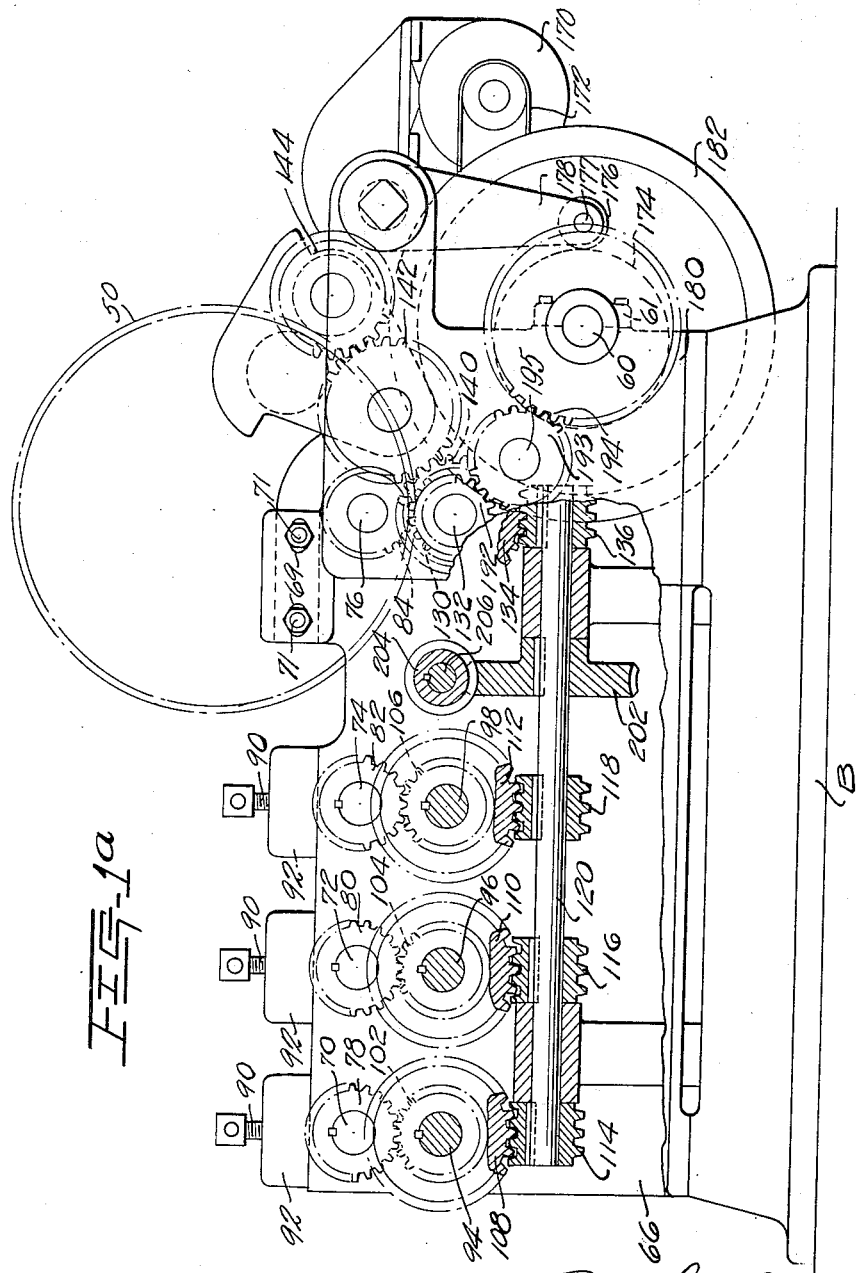

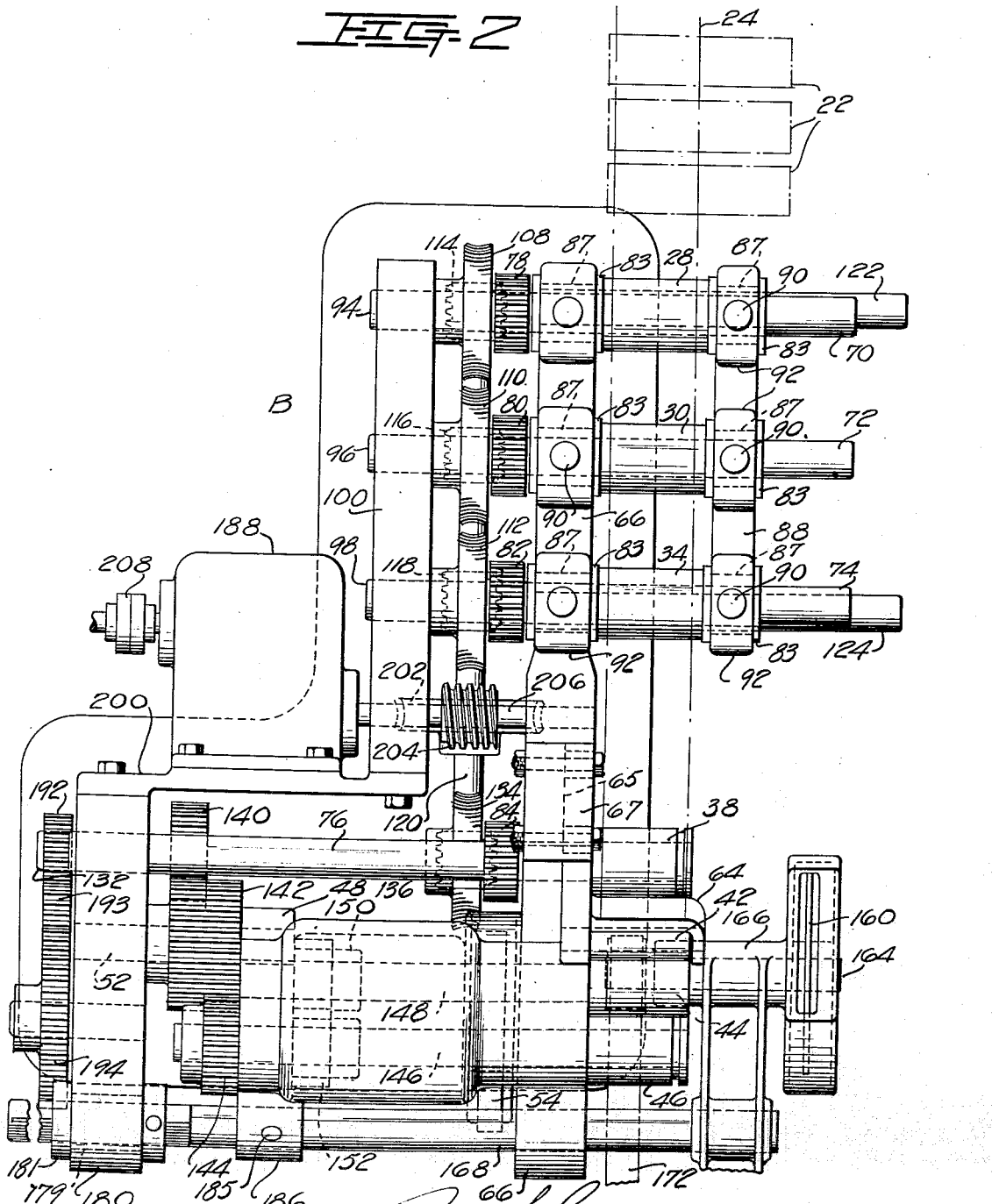

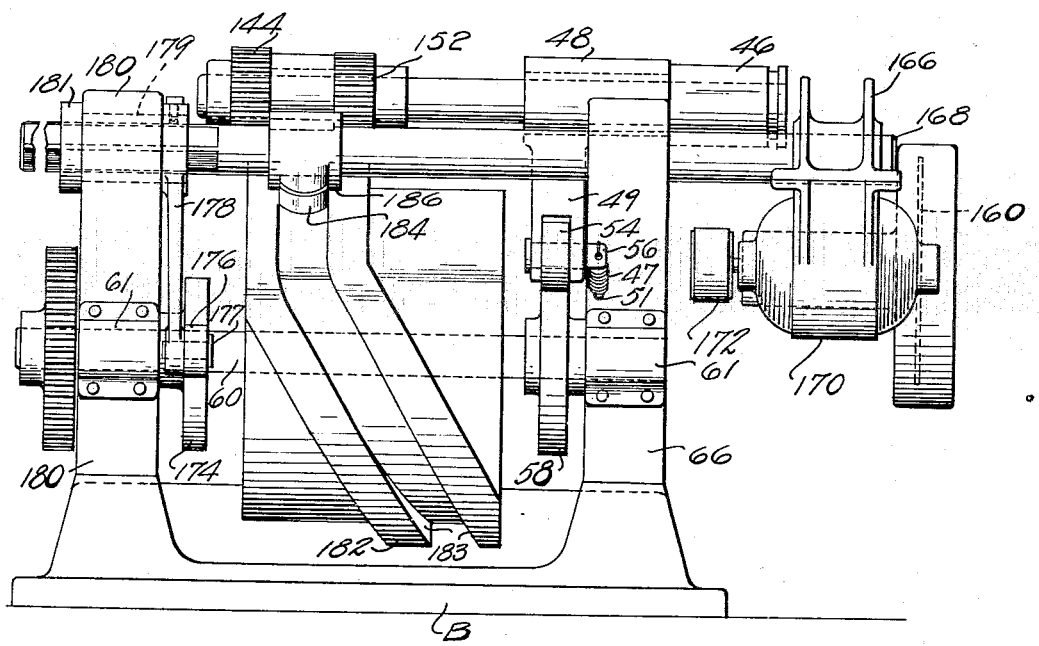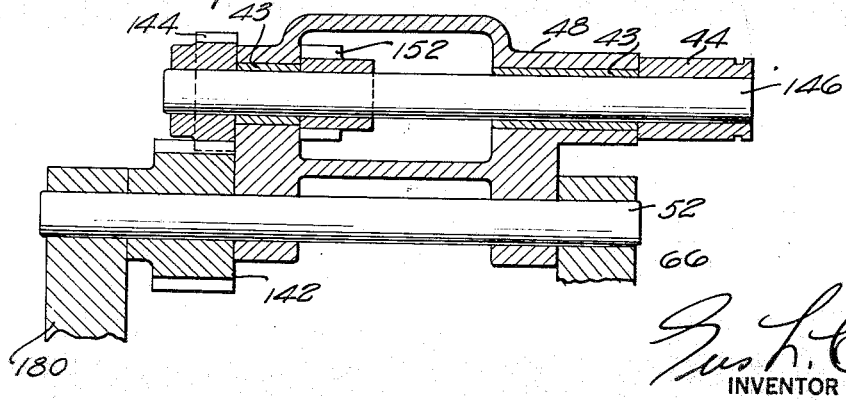

Patented Apr. 17, 1934

1,955,410

UNITED STATES PATENT OFFICE 1,955,410

METHOD AND APPARATUS FOR MAKING TUBULAR ARTICLES FROM STRIP MATERIAL

Gus L. Colbie, Brooklyn, N. Y., assignor to F. MacGovern Corporation, New York, N. Y., a corporation of New York Application April 23, 1932, Serial No. 607,101

14 Claims. (Cl. 113—35)

My invention relates to a method and apparatus for forming strip material into spiral convolutions joined together at their edges to form tubular articles, and more particularly said invention is designed to form such articles having tapering forms or other surfaces of revolution of any desired longitudinal cross section rather than perfectly cylindrical.

It is one object of my invention to provide a device for forming such articles from strip material in which the diameters at successive points vary progressively, thus permitting the production of such shapes as bilge barrels, casings having the outlines of the frustum of a cone and the like to be made, which shapes are new in the manufacture of strip formed tubular articles.

Another object is to form such articles in one continuous length and cut them into desired lengths, while the machine is in continuous operation.

In the process of manufacture of the various products made on my improved machine, a continuous strip of metallic or other flexible but self-sustaining material is drawn through forming rolls which preform the edges thereof for interlocking engagement, after which said strip passes around a bending roll and through a pair of seam-locking rolls. The first convolution is suitably formed by the bending rolls and is then guided by hand to bring the starting end of same into proper engagement with the adjacent strip portion, after the first convolution is completed. After the end has become interlocked with the beginning of the second convolution, the formation of said second convolution and all succeeding convolutions will be done continuously by the machine.

To form a tubular article having varying diameters, such as a bilge barrel, for example, the seam-locking rolls are adapted to be moved gradually and simultaneously outward from, or inward toward, the axial center of said article by means of a cam actuated arm-member and cam roll carried by the latter, in which arm-member the seam-locking rolls are mounted. This method of varying the position of said seam-locking rolls increases or decreases the diameter of each succeeding convolution and may be so carried on as to form a barrel having a larger diameter at its center than at its ends. Such barrel formation is continuous, one barrel following another in continuous order and being initially joined integrally together at their ends in the form of a continuous tube.

While the second barrel is being formed, however, a bracket, having a suitable cutting off mechanism on it, is adapted to be moved synchronously with the work, and, through a cam-actuated arm and roll forming a part of said bracket, said cutter-bracket is adapted to be rocked and thereby cause the cutter to engage the advancing tubular structure at the junction of two adjacent, rotating barrel convolutions, and thus sever the same and permit the completed barrel section to drop off. After severing this from its adjoining partly completed barrel structure, the cutting off mechanism is returned, preferably by a quick-return-motion, to its original position in time to repeat the severing operation on the next succeeding portion of the tubular structure being continuously formed as above described.

Various shaped tubular articles can be made on this machine by merely substituting different cams having suitable forms to control the gradual adjustment of the arm supporting the seam-locking rolls. The various shaped cams therefor may be termed patterns, since each controls the shape or contour of the product then being made.

In the following drawings, I have illustrated one embodiment of my invention in which Fig. 1 is a front elevation of the machine.

Fig. 1a is a rear view of the machine with parts broken away and others shown in section.

Fig. 2 is a plan view of the same, with parts broken away, and the location of certain cooperating apparatus indicated in broken lines.

Fig. 3 is an end elevation looking in the direction of arrow 3, Fig. 1.

Fig. 4 is a section taken on the line 4—4 of Fig. 1.

In the drawings like reference characters represent like parts.

Referring to Fig. 1, the strip material 24, from which the product is made, is introduced at the right hand end through a straightening mechanism comprising suitable rolls 22 placed above and below said material strip 24. Since this said straightening mechanism is of conventional form, and does not constitute an essential part of the present invention, it is only diagrammatically indicated in broken lines. The purpose of said straightening mechanism is to remove sharp bends and kinks usually encountered in commercial material of the kind here used.

Figure 5:
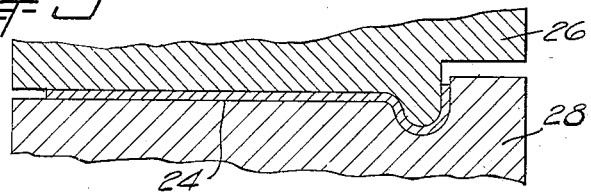
Fig. 5 is an enlarged fragmentary section of one set of the edge-forming rolls taken on the line 5—5 of Fig. 1.
Figure 6:
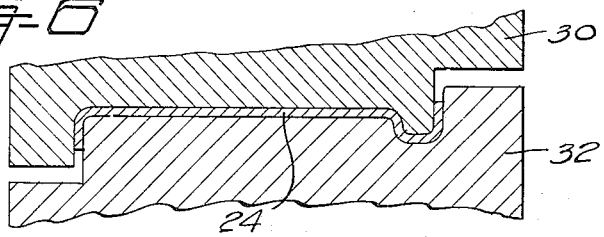
Fig. 6 is a fragmentary section of another set of the edge-forming rolls taken on the line 6—6 of Fig. 1.
Figure 7:
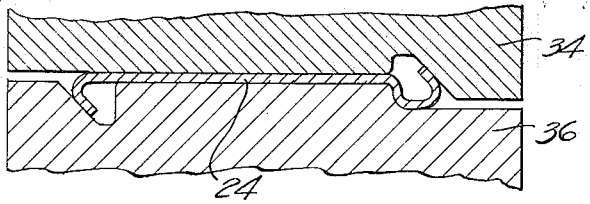
Fig. 7 is a fragmentary section of a third set of the edge-forming rolls on the line 7—7 of Fig. 1.
Figure 8:
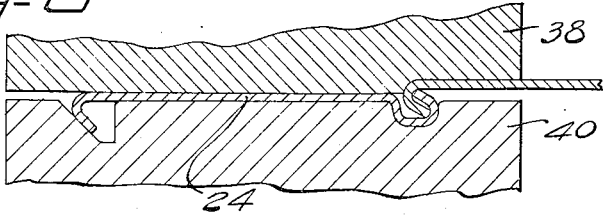
Fig. 8 is a fragmentary section of the edge-intermeshing rolls taken on the line 8—8 of Fig. 1.

After passing through the above said straightening mechanism, the strip 24 of material enters the first set of edge-forming rolls 26 and 28 which perform a preliminary operation upon one edge of said strip material as shown at the right hand of Fig. 5. Said strip 24 then passes through the next set of edge-forming rolls 30 and 32, where the shape of this partly formed edge is further modified and the opposite edge also receives a preliminary shaping operation as shown in Fig. 6. Next the strip passes through a third set of edge-forming rolls 34 and 36 shown in Fig. 7, where the shapes of the two edges are further modified and are prepared for the interengagement of one edge with an adjacent edge of another portion of said strip which had been formed into a convolution. After said adjacent edges are intermeshed, they are partially closed onto each other by the rolls 38 and 40, as shown in Fig. 8, but the joint is loose enough to permit relative longitudinal slipping movement of the two interengaged strip portions for a purpose to be hereinafter described. The strip 24 next passes over a bending roll 42, which is so located with reference to rolls 38, 40 and another pair 44, 46 through which said strip next passes, as to cause the strip to be bent into an arc of the proper radius to form the desired convolution diameter of that portion of the tubular article to be formed, this being possible because the intermeshed seam elements are not as yet locked together, or clamped down one upon the other. Finally, the strip passes between the rolls 44 and 46, which perform the final closing operation of locking the seam after it has been loosely formed and the strip has (as above described) been bent to the proper curvature to conform to that of the previously assembled portions of the article in process of manufacture.

Assuming the aforesaid forming, bending and seam-locking operations to have been performed on the starting strip to properly shape the first convolution, the starting end of said strip will then be guided by hand or any other suitable way, until the said end is intermeshed and locked to one edge of the adjoining strip portion which will subsequently form the second convolution. After the formation of the first convolution with the required diameter, as described, all subsequent convolutions will be formed automatically and their diameters adjusted automatically by such controlling elements as will now be described.

The machine in general comprises a base B on which is supported a frame structure having three stationary longitudinally extending wall members 66, 100 and 180, between opposite walls of which most of the operating mechanism is mounted. A sub-frame 88 is slidingly mounted on two bars 122, 124 (Fig. 1), which bars are supported by the frame member 66.

A power drive is indicated in Fig. 2 and comprises a reduction gear mechanism enclosed within a gear box 188 and adapted to be driven by a motor or pulley (not shown). Said gear box 188 is mounted on a support 200, which support is secured to the walls 100, 180, and serves as a tie plate joining said walls. A power driving worm 204 is mounted on a power shaft 206 and is driven by the mechanism in the gear box 188. A worm wheel 202 driven by the worm 204 is mounted on a shaft 120 which shaft is mounted in bearings 121, and will be referred to hereafter as the drive shaft, since all of the operating mechanism is driven from gearing mounted on some part of said shaft.

In Fig. 1a the driving mechanism for the forming rolls is clearly shown as comprising four worms 114, 116, 118 and 136 mounted on the drive shaft 120 and which drive their respective worm wheels 108, 110, 112 and 134, said worm wheels being mounted on their respective shafts 94, 96, 98 and 132. The said shafts 94, 96, 98 and 132 are journaled in suitable bearings in the walls 100, 66 and 88, and support the lower forming rolls 28, 32, 36 and 40 respectively.

The upper forming rolls 26, 30, 34 and 38, are mounted on shafts 70, 72, 74 and 76, respectively, some of which shafts are journaled in journal boxes 83 mounted within slotted openings 87, in the wall 66 and subframe 88, in such manner as to permit same to be adjusted vertically to permit strip material of various thicknesses to be used without changing the forming rolls and to provide the required pressure upon same. Said adjustments are made by adjusting screws 90, attached to the journal boxes 86, which journal boxes are adapted to be raised or lowered slightly, when the said screws 90 are rotated within their supporting caps 92, said caps straddling the slotted openings 87 in wall 66 and subframe 88.

The upper forming rolls are rotated by means of spur gears 78, 80, 82 and 84 on the upper shafts 70, 72, 74 and 76 respectively, which mesh with similar gears 102, 104, 106 and 130 on the lower driven shafts 94, 96, 98 and 132.

The forming rolls 38 and 40 are located directly beneath the central axis of the convolutions 50 as indicated in Fig. 1, while the seam locking rolls 44, 46 and the bending roll 42 are located in the arc shaped path of a strip convolution. Said bending roll 42 is free to rotate on a pin 62 mounted within the forked end of a bracket 64, and said bracket is slidably mounted within a slotted portion 65, in an upper extension 67, of the frame 66. Slots 69 may be provided in the bracket 64, through which fastening bolts 71 are adapted to pass, to provide a means for adjusting from time to time the bending roll 42 so that its surface will occupy the proper position, and so maintain contact with the strip portion being bent around it during the slow and limited swinging movement of the seam-locking rolls 44 and 46 which may be gradually produced by the pattern cam 58, in the manner next to be described.

The seam locking rolls 44 and 46 are mounted in a rocker frame 48 which is pivotally mounted on a stationary shaft 52, said shaft being located between the frame walls 66 and 180 and supported by suitable bearings within said walls. An arm 49, extending outward and forming a part of said rocker frame 48, has a forked outer end, within which is mounted a stud 56 and on which stud is freely mounted a cam roll 54. A cam shaft 60 is journaled in bearings 61 secured to the outer ends of walls 66 and 180, on which shaft a cam 58 is mounted in alignment with the cam roll 54 on the rocker frame arm 49. Any suitable means may be employed to adjust the position of the rolls 38 or 44 for varying thicknesses of strip material, one method being the use of eccentric bushings indicated at 37 and 43 (Figs. 1 and 4).

It is evident that if the cam 58 were held stationary, or any other means were employed for holding the rocker frame 48 continuously in one position so that the contact surfaces of seam-forming rolls 38 and 40, bending roll 42, and seam-locking rolls 44 and 46 were all tangential to a fixed arc, the operation of the machine would then result in the formation of a truly cylindrical tube, the radius of which would be the radius of such fixed arc.

Figure 9:
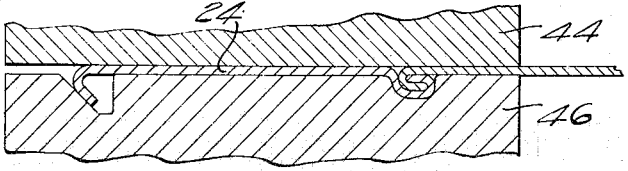
Fig. 9 is a fragmentary section of the lock-seam closing rolls taken on the line 9—9 of Fig. 1.

The process of forming such tube would then be as follows: The forward end of the strip with its partially bent edges would pass through the seam-forming rolls 38, 40, and first be flexed (by hand) around bending roll 42, and then so guided (by hand) that the end of the strip would pass through seam-locking rolls 44, 46, but the latter would not exert pressure on the single, bent strip edge thus passing through them. These rolls, however, in cooperation with rolls 38, 40 and 42, would progressively give to the single strip section passing through them the predetermined curvature of the radius desired. After a length of strip equal to the circumference of the tube to be formed had passed rolls 38, 40, the end of the strip would again come behind said rolls and would then have its left hand bent edge (when looking in the direction in which the strip was traveling) intermeshed by the operator with the right hand bent edge of the approaching portion of the strip, which would be destined to form the second convolution of the strip wound structure. These two intermeshed portions would then pass side by side through the rolls 38, 40, (this being the second such passage for the first strip convolution) and the seam would be thereby formed and closed, as shown in Fig. 8, but the sections thus intermeshed would not be clamped tightly together, or locked. Consequently they could easily make whatever slight mutual readjustments might become necessary as the second strip portion was progressively bent around roll 42 to form the second convolution. This bending of each new section would also largely be effected by the turning motion of the strip convolution ahead of it, and with which it had been intermeshed, but to complete and standardize the curving of the freshly presented strip portion the action of the bending roll 42 would still be needed. All this bending would occur before the intermeshed strip portions reached the seam-locking rolls 44, 46, and by the time the latter were reached all the parts would have assumed their final relative positions and ultimate curvatures, so that the intermeshed flanges could then be finally locked together by the bite of said seam-locking rolls 44, 46, which would then be effective because the normal number (four) of strip thicknesses would be presented to them, as shown in Fig. 9. The entire operation would thereafter be continuous as the strip was fed through the rolls 38, 40, and around 42.

The above described method of forming a strip wound tubular structure is believed to be novel and to present several advantages over prior practice which has mainly consisted in making small tubes by winding the strip on a mandrel and locking the bent flanges together by pressure of individual, exterior rolls forced radially toward the mandrel axis. It has also been proposed to make strip-wound articles of large diameter by employing a single set of combined seam-forming and seam-locking rolls having two passes, one of which did the seam-forming and the other the seam-locking. The intermeshed, but not yet locked, convolutions were then bent to the desired curvature by forcing them around the interior of a hardened ring while going from one roll pass to the other. But this procedure developed excessive friction and is otherwise objectionable. Furthermore, it can produce only cylindrical tubes of uniform diameter, whereas, by employing a separate set of seam-locking rolls 44, 46, spaced away from the seam-forming rolls 38, 40, in a direction circumferential of any tubular article being formed thereby and mounted on a swinging housing or rocker frame such as 48 hereinbefore described, tubes of any desired diameter may be produced with my invention by adjusting said housing or rocker frame so as to produce a bend of any desired radius of curvature. Also, in addition, by progressively varying the position of such housing during the operation by means of a pattern cam, tubular articles each having different diameters at different points in their lengths can be produced.

The cam 58 shown in the drawings is shaped to provide a pattern for forming a cylinder having varying diametrical dimensions, such as the common form of bilge barrel, and when this cam is rotated, the cam roll 54, cooperating therewith, will occupy constantly varying positions as a result of its contact with said cam surface, thereby gradually swinging the rocker frame 48, and seam locking rolls supported therein. This causes the radii of each convolution to be gradually changed as it is formed, thus producing a spiral seam line and tapering or other formed body in the article being built up out of successive convolutions of the strip material. The cam roll 54 is maintained in contact with the cam edge by means of a spring 47 stretched (as shown in Fig. 1) between the end of the stud 56 and a pin 51 in the frame 66. If desired, a grooved face cam may be used, in which the cam roll will always be in positive engagement.

The driving power for the seam locking rolls 44 and 46, is transmitted through the shaft 132, which shaft is driven by worm and worm gear drive 136, 134 from the main drive shaft 120, said shaft 132 also having a gear 140 mounted thereon. An intermediate gear 142, meshing with said gear 140, is freely mounted on the stationary shaft 52, upon which the rocker frame 48 pivots, and meshes with a gear 144, on the outer lock seam roller shaft 146, which extends beyond the rocker frame. Two intermeshing spur gears 150 and 152 are mounted on shafts 148 and 146 respectively, and on these shafts are also mounted the seam locking rolls 44 and 46. The rocker frame is adapted to be rocked without interfering with the gear drive mechanism described above, since the gear 144 on the lock seam roller shaft 145 is adapted to oscillate around the periphery of the intermediate gear 142 due to the fact that both the said intermediate gear and rocker frame are mounted on the same shaft and that the gear 144 is carried by the rocker frame, as is clearly shown in Fig. 4.

From the foregoing description it will readily be seen that any movement of the rocker frame 48, imparted through the cam 58 and cam roll 54, will cause a progressive decrease or increase in the radii of the convolutions being formed, so as to develop a spiral according to the pattern of said cam, and that on the completion of one revolution of said cam, the length of one section of the tubular article formed out of the convolutions of strip material, will be completed.

Figure 10:
Figs. 10 and 11 show the outlines of two types of products which can be made by the machine herein described.
Figure 11:

Since the operation of this machine is continuous and the cam 58 is revolved continuously, the production of said formation is also continuous, being composed of successive, similar sections, each of gradually increasing or decreasing diameters at successive portions of its length; i. e., these successive sections will be initially joined as one integral unit, as illustrated in Figs. 10 and 11, and it only remains to cut the sections apart to form a plurality of uniform reproductions of the same form.

It is therefore necessary to provide some means for severing each section along its line of juncture with its adjoining section, and to perform the said severing operation while the other machine operations are in progress, which means, of course, that the cutting mechanism must travel with the work during each such cutting operation and then make a return movement before repeating the severing operation. To accomplish this, I have provided a rotary cutting disc 160, preferably formed of some abrasive material, which disc is mounted on a cutter shaft 164 and rotated by means of a motor 170, through a belt and pulley connection indicated at 172. Said cutter shaft 164 is journaled within a frame 166, at the inner end of said frame, while the motor 170 is mounted on the outer end of said frame. The entire frame with its cutter and motor drive assembly is automatically moved longitudinally with the work due to its sliding mounting on a bar 168, said bar being supported within bearings in the frame walls 66 and 180.

Two separate classes of movement are required of the cutter mechanism to complete each cycle of severing operation. One class comprises longitudinal movements to carry the said cutter mechanism synchronously with the work and to return it to its original position; the other class comprises one radial movement with reference to the tube to bring the cutter into cutting contact with the tube, and another to withdraw it from such contact after each cutting operation is completed.

These movements of the first class are produced by means of a drum cam 182 mounted on the shaft 60 and having a cam track 183 on the surface thereof, within which a cam roller 184 is adapted to ride. Said cam roller is freely mounted on a pin 185 extending through a sleeve 186 fixed to the sliding bar 168. The rotation of said drum cam 182 will therefore cause the cam roller to be moved along by the cam track 183 and correspondingly move the sliding bar, and the cutter mechanism carried thereby, in a longitudinal direction, first simultaneously with the moving work, and then back again.

The second, or radial movements, are produced by means of a cam actuated mechanism which comprises a cam 174 mounted on the shaft 60, and continuously engaged by a cam roll 176, freely rotatable on a pin 177, which pin is secured to one end of an arm 178. Said arm 178 is fast on a sleeve 179, which sleeve provides a journal mounting for one end of the sliding bar 168, and is prevented from making any longitudinal movement by the flanged end 181 of sleeve 179 and the upper end of the lever 178 joined to said sleeve, which bear on opposite faces of the frame 180, in which sleeve 179 is journaled.

The end of the sliding bar 168, which passes through the sleeve 179, is of a square cross section, and the opening in said sleeve 179 has a correspondingly squared opening. Therefore, when the arm 178 is rocked by the cam 174, the sliding bar 168 is correspondingly rocked through the sleeve 179. During this rocking movement of the bar 168, the cutter frame 166 secured to said bar, is also correspondingly rocked, which movement causes the cutter disc to be moved into the path of the tube being formed from the strip convolutions, to cut through the walls of said tube and sever one section thereof from the remainder, and so complete the barrel or other product desired. As the square end of the bar 168 passing through the square opening in sleeve 179 may slide therein, it is permitted to move longitudinally therefrom when moved longitudinally by the cam and cam roll mechanism 182 and 184, while, during a portion of the time, it also is slightly rotated by cam 174 to move the cutting disc 160 toward or from the tube which it is to cut.

The means for driving the cam shaft 60 comprise a train of change gears 192, 193 and 194, the first one 192 of which is mounted on the driven shaft 132 projecting outwardly from the frame 180, and which meshes with the second, or intermediate gear 193, mounted on a stub shaft 195 in the frame 180, said intermediate gear meshing with the third gear 194, mounted on the cam shaft 60. As the gear train 192, 193, 194, is designed to always reduce the rotary speed transmitted from shaft 132, and this shaft rotates at the same speed as do the edge bending and seam-forming and locking rolls, it follows that the cam shaft 60 will revolve at a speed relatively slower than that of said rolls. Adjustments of the change gears would usually be made such that a reduction in speed of cam rotation much greater than that indicated in the drawings would result.

Since the strip convolutions are normally formed at a relatively high speed, and since it is necessary to cut off each section of the tube being formed out of said convolutions in one revolution of said tube, it may be necessary to reduce the speed of rotation of the tube during the severing operation which must be completed during the formation of one convolution. Any suitable method of speed reduction may be utilized for this purpose, as by the use of any "slow-speed" gearing, such as the back gear of a lathe, which the operator could throw into mesh with the driving train of edge bending and seam forming rolls during the cutting operation.

Various changes may be made in the details of construction here shown and described as forming one embodiment of my invention, any such modifications still being within the underlying principles and general scope of the invention here claimed if the method of operation explained above is substantially preserved, and the results described are still obtained. I am aware that heretofore helically wound tubing of relatively small diameters has been made in large quantities by winding a strip of metal as a helix around a revolving mandrel, while rolls journalled in various positions circumferentially of said mandrel cooperate with it to form and lock a continuous helical seam joining the adjacent edges of the strip so wound to produce the tube. This method, however, can not be easily adapted to the formation of tubes of large diameter, is handicapped by the difficulty of getting the mandrel out of the completed tube, and can only produce true cylinders of one fixed diameter.

In such prior art apparatus the mandrel serves in several capacities. This at a point opposite the radially disposed seam forming roll the immediate section of the mandrel circumference serves as a member of the pair of rolls necessary for doing that work. At a point opposite the seam locking roll it similarly serves as a member of a second pair of rolls doing the seam locking. Also that arc of its surface extending between the seam forming roll operation and the seam locking roll operation, serves as a bending roll, and, as that arc has a fixed radius, all successive sections of the strip operated on are bent to the same, uniform, curvature, so that a true cylindrical form is inevitably given to the finished product.

My present invention discards this unchangeable mandrel and distributes its three above described functions to three separate and relatively adjustable roll units, (1) a pair of rolls doing seam forming only, (2) a separate bending roll, and (3) a separate pair of seam locking rolls. Many practical mechanical benefits result from this novel distributive arrangement of roll functions which will be obvious to those skilled in the art, but the outstanding advance results from the fact that the flexibility of this triune roll system makes it a simple matter for one machine to wind up a tubular article of any desired diameter (within wide limits), and that any such product may be given a curved or tapering longitudinal section, thus solving the problem, among others, of the cheap and rapid manufacture of steel barrels with any desired curvature in their bilges.

Having described my invention, I claim

1. In a machine for forming tubular articles from strip material wound upon itself in spiral convolutions, which said machine has a series of forming rolls for preforming the edges of said material for interengagement, the combination, with said above-described apparatus, of a pair of grooved rolls for producing a loose interengagement between the overlapping edges of two adjacent convolutions of said strip, a separate pair of rolls for locking the seam so formed, which said second pair is spaced away from said first-mentioned pair, in a direction circumferentially of any tubular article being formed thereby, gearing for positively rotating all said rolls synchronously, and a bending roll located between said two last-before-mentioned pairs of rolls in a position that will cause the portion of the strip passing around it between said sets of rolls to be bent into an arc of predetermined radius much greater than the radius of said bending roll.

2. A combination such as defined in claim 1, in which one of said last-mentioned three sets of rolls is adjustable in a direction which will vary the curvature of the arc to which said strip is thereby bent.

3. An apparatus such as defined in claim 1, in which one of said last-mentioned three sets of rolls is adjustable in a direction which will vary the curvature of the arc to which said strip is thereby bent, combined with pattern means for automatically varying the position of such movable set during the strip winding operation.

4. In a machine for forming tubular articles from strip material wound upon itself in spiral convolutions, the combination of forming rolls adapted to preform the edges of said strip material for interlocking engagement when passed through seam locking rolls, a set of such seam-locking rolls mounted in an automatically movable housing therefor, so as to vary the position of said seam locking rolls while said strip material is passing therethrough, together with a pattern means for shifting the position of said housing, and a cutter adapted to sever the tube into predetermined lengths, during its formation.

5. In a machine for forming tubular articles from strip material in spiral convolutions, the combination of edge forming rolls, adapted to preform the edges of said strip material for interlocking engagement, with a pair of oppositely disposed seam locking rolls and a bending roll separate therefrom, which seam locking rolls and bending roll are respectively journaled at spaced apart points along an arc tangent to the initial line of travel of said strip through said forming rolls, and means for advancing said strip along said path, whereby, after one helical convolution of said strip material has been formed with the side edges of its overlapping ends interlocked between said seam-locking rolls, further advance on the strip will produce successive interlocked convolutions.

6. In a machine for forming tubular articles from strip material out of interlocked spiral convolutions thereof, the combination of edge forming rolls adapted to preform the edges of said strip material for interlocking engagement, together with a pair of oppositely disposed seam locking rolls and a bending roll separate therefrom placed in such relation in respect to the edge forming rolls and to each other as to bend that portion of the strip material suspended between the seam locking rolls and the last edge forming rolls into an arcuate form.

7. A combination such as defined in claim 6 in which said seam-locking rolls are adjustable radially of the arc so formed.

8. In a machine for forming tubular articles from strip material in spiral convolutions, the combination of forming rolls adapted to preform and interengage the edges of strip material for interlocking engagement, a final set of seam-locking rolls and mechanism for rotating all said rolls, together with synchronously movable pattern means for varying the position of the final seam locking rolls with reference to the others, and a cutter movable sidewise with the tube being formed adapted to cut off sections of each tube; whereby a plurality of tubular articles each of predetermined length may be produced.

9. In a machine for forming interlocked convolutions of strip material, the combination of strip edge-forming and feeding rolls, with convolutions shaping and seam-locking rolls, a movable housing for said seam-locking rolls and synchronously moving pattern means adapted to progressively vary the position of said housing while all said rolls are being rotated; whereby a tube of progressively varying diameters is produced.

10. A combination such as defined in claim 9 in which said pattern means comprises a cam, mechanism for rotating it at a speed relatively much slower than that of said rolls, and a lever bearing on said cam and supporting said seam-locking rolls.

11. An apparatus such as defined in claim 9 in which said pattern means comprises a cam and mechanism for rotating it at a speed much slower than that of said rolls, combined with a rotary cutter adjustable toward and from said tube, and means for intermittently reciprocating said cutter along with such tube and then back again to its original position comprising a cam rotating at the same speed as said pattern cam; whereby said tube is always cut at corresponding points in the repeat pattern according to which it has been shaped.

12. An apparatus such as defined in claim 9, in which said pattern means comprises a cam and mechanism for rotating it at a speed much slower than that of said rolls, combined with a rotary cutter adjustable toward and from said tube and movable sidewise synchronously with the tube being formed, mechanism for so moving said cutter part of the time and then returning it to its original position, and means for reciprocating said cutter toward and from such tube comprising a cam rotating at the same speed as said pattern cam; whereby said tube is always cut at corresponding points in the repeat pattern according to which it has been shaped.

13. The herein described method of producing a tubular article having progressively varying diameters, which comprises crimping the edge portion of a continuous metal strip so that they will hook one into the other when assembled in a continuous spiral formation of continuous convolutions, winding said strip into such formation while causing said edge portions to mutually engage loosely so that they may slide one upon the other, bending each pair of strip sections so engaged to arcs of progressively varying curvature, and finally clamping together their engaged edge portions in the particular condition of curvature theretofore given them.

14. A method of producing a uniform series of tubular articles each of progressively varying diameters, which consists in performing the series of steps recited in claim 13 while successively increasing and decreasing said diameter according to a predetermined, recurrent pattern, and then severing the tube so formed into uniformly shaped sections by cutting it transversely at points equally spaced apart axially thereof.

GUS L. COLBIE.